US007723679B2

(12) United States Patent
Tolley et al.

(10) Patent No.: US 7,723,679 B2
(45) Date of Patent: May 25, 2010

(54) COAXIAL HYBRID RADIO FREQUENCY ION TRAP MASS ANALYZER

(75) Inventors: Samuel E. Tolley, Springville, UT (US); Daniel E. Austin, Mapleton, UT (US); Aaron R. Hawkins, Provo, UT (US); Edgar D. Lee, Highland, UT (US)

(73) Assignee: Brigham Young University, Provo, UT (US)

( * ) Notice: Subject to any disclaimer, the term of this patent is extended or adjusted under 35 U.S.C. 154(b) by 318 days.

(21) Appl. No.: 12/036,999

(22) Filed: Feb. 25, 2008

(65) Prior Publication Data

US 2008/0210859 A1 Sep. 4, 2008

Related U.S. Application Data

(60) Provisional application No. 60/891,373, filed on Feb. 23, 2007.

(51) Int. Cl.
*B01D 59/44* (2006.01)
*H01J 49/00* (2006.01)

(52) U.S. Cl. ....................... 250/292; 250/281; 250/282; 250/287; 250/290

(58) Field of Classification Search ....................... None
See application file for complete search history.

(56) References Cited

U.S. PATENT DOCUMENTS

| | | | | |
|---|---|---|---|---|
| 6,627,993 | B1 | 9/2003 | Shen | |
| 6,987,261 | B2 * | 1/2006 | Horning et al. | 250/282 |
| 7,196,324 | B2 | 3/2007 | Verentchikov | |
| 7,227,138 | B2 * | 6/2007 | Lee et al. | 250/292 |
| 7,375,320 | B2 * | 5/2008 | Lee et al. | 250/292 |
| 7,495,211 | B2 * | 2/2009 | Franzen et al. | 250/291 |
| 7,504,620 | B2 * | 3/2009 | Sato et al. | 250/287 |
| 7,589,320 | B2 * | 9/2009 | Baba et al. | 250/290 |
| 2003/0020012 | A1 * | 1/2003 | Guevremont | 250/287 |
| 2003/0038235 | A1 * | 2/2003 | Guevremont et al. | 250/287 |
| 2003/0089846 | A1 * | 5/2003 | Cooks et al. | 250/281 |
| 2003/0089847 | A1 * | 5/2003 | Guevremont et al. | 250/282 |
| 2005/0121609 | A1 * | 6/2005 | Makarov et al. | 250/290 |
| 2006/0214100 | A1 * | 9/2006 | Verentchikov et al. | 250/287 |
| 2009/0206250 | A1 * | 8/2009 | Wollnik | 250/290 |

* cited by examiner

*Primary Examiner*—David A Vanore
(74) *Attorney, Agent, or Firm*—Morriss O'Bryant Compagni, P.C.

(57) ABSTRACT

A coaxial hybrid ion trap that uses two substantially planar opposing plates to generate electrical focusing fields that simultaneously generate at least two different types or shapes of trapping regions, wherein a first trapping region is a quadrupole trapping region disposed coaxially with respect to the opposing plates, and wherein a second trapping region is a toroidal ion trap having a toroidal trapping region that is simultaneously created around the quadrupole trapping region.

29 Claims, 11 Drawing Sheets

COAXIAL HYBRID RADIO FREQUENCY ION TRAP MASS ANALYZER

CROSS REFERENCE TO RELATED APPLICATIONS

This document claims priority to and incorporates by reference all of the subject matter included in the U. S. provisional patent application, having Ser. No. 60/891,373 and filed on Feb. 23, 2007.

BACKGROUND OF THE INVENTION

1. Field of the Invention

This invention relates generally to storage, separation and analysis of ions according to mass-to-charge ratios of charged particles and charged particles derived from atoms, molecules, particles, sub-atomic particles and ions. More specifically, the present invention is a combination of two or more trapping regions in a single device that enables a user to obtain increased sensitivity without suffering the effects of high space-charge, and increased resolution for greater analytic capability.

2. Description of Related Art

Mass spectrometry continues to be an important method for identifying and quantifying chemical elements and compounds in a wide variety of samples. Mass spectrometry is also among the most widely used analytical techniques. The combination of high sensitivity, high chemical specificity, and speed make it a method of choice for many applications.

Mass spectrometers are used in such areas as proteomics research, clinical analysis, protein sequencing, planetary science, geology, identification and structural determination of organic molecules, drug discovery, surface characterization, forensics, study of chemical reactions, elemental analysis, manufacturing, security screening, air monitoring, etc. High sensitivity and selectivity of mass spectrometry are especially useful in threat detection systems (e.g. chemical and biological agents, explosives) forensic investigations, environmental on-site monitoring, and illicit drug detection/identification applications, among many others.

Many mass spectrometers on the market use ion traps for mass analysis. In ion traps, ions are contained and analyzed using radiofrequency electric fields. Primarily quadrupolar fields are used, but numerous variations exist in which other fields are used to manipulate the ions. For instance, small dipole or octupole fields can be used to increase performance. Monopoles, dipoles or direct-current biases can be used for ion ejection. Ions or charged particles can be trapped for long periods of time and used for various other experiments. The numerous variations have led to many specialized applications and experiments that cannot be done any other way. In addition, efforts at producing miniaturized and portable mass spectrometers are based primarily on ion trap mass analyzers.

Several variations of ion trap mass spectrometers have been developed for analyzing ions. These devices include quadrupole configurations, as well as Paul, dynamic Penning, and dynamic Kingdon traps. In all of these devices, ions are collected and held in a trap by an oscillating electric field. Changes in the properties of the oscillating electric field, such as amplitude, frequency, superposition of an AC or DC field and other methods can be used to cause the ions to be selectively ejected from the trap to a detector according to the mass-to-charge ratios of the ions.

Of particular relevance to the present invention is the development of a "virtual" ion trap that is taught in U.S. Pat. No. 7,227,138. The '138 patent teaches the use of electric focusing fields instead of machined metal electrodes that normally surround the trapping region. In the virtual ion trap electric focusing fields are generated from electrodes disposed on generally planar, parallel and opposing surfaces such as plates. The term "virtual" thus applies to the fact that the confining walls of electrodes are replaced with the "virtual" walls created by the electric focusing fields. The electrodes are disposed on the two opposing plates using photolithography techniques that enable much higher tolerances to be met than existing machining techniques.

The '138 patent also teaches that electrodes used to create a trapping region in conventional ion traps also created substantial barriers, by themselves, to the flow of ions, photons, electrons, particles, and atomic or molecular gases into and emissions out of the ion traps.

Several important features are described in the '138 patent about the embodiments of the virtual ion trap. First, some solid physical electrode surfaces of linear RF quadrupoles and other prior art ion traps are eliminated in favor of virtual electrodes. The virtual electrodes are formed by arranging a series of one or more electrodes on the opposing plates that generate constant potential surfaces similar to the solid physical surfaces that the electrodes replace.

Second, the opposing plates or faces as they are sometimes called are aligned so as to be mirror images of each other.

Third, the opposing faces are substantially parallel to each other.

Fourth, the opposing faces are substantially planar. However, it is noted that the opposing faces may be modified to include some arcuate features. However, optimum results will be maintained by making the opposing faces generally symmetrical with respect to any arcuate features that they may have to thereby make it easier to create a desired trapping region.

FIG. 1 is provided as an illustration of an embodiment of the virtual ion trap 10 described in the '138 patent. The inside and opposing faces 12 have an oscillating electrical field 14 applied thereto. The outside faces 16 have a common potential applied that is a common ground in this case.

It is observed that some of the systems described above, such as the virtual ion trap, are capable of generating multiple trapping regions. However, none of the systems above has been used to create more than one type or shape of trapping region. Accordingly, it would be an advantage over the prior art to provide a mass analyzer that is capable of generating at least two different types of trapping regions so that the advantages of each can be exploited simultaneously in a single device.

BRIEF SUMMARY OF THE INVENTION

In a preferred embodiment, the present invention is a coaxial ion trap that uses two opposing plates to generate electrical focusing fields that simultaneously generate at least two different types or shapes of trapping regions, wherein a first trapping region is a quadrupole trapping region disposed coaxially with respect to the opposing plates, and wherein a second trapping region is a toroidal trapping region that is simultaneously created around the toroidal trapping region.

In a first aspect of the invention, a plurality of toroidal trapping regions can be simultaneously created around the centrally located quadrupole trapping region.

In a second aspect of the invention, the position of the trapping regions is dynamically changed with respect to a central axis of the two opposing plates.

In a third aspect of the invention, the volume of the individual trapping regions can be changed.

In a fourth aspect of the invention, ions can be moved between trapping regions.

In a fifth aspect of the invention, ions can be injected and ejected radially with respect to the opposing plates.

In a sixth aspect of the invention, ions can be injected and ejected through an aperture or apertures in the opposing plates.

In a seventh aspect of the invention, ions can be transported within a mobile trapping region from one trapping region to another trapping region.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The present invention is a coaxial hybrid ion trap comprised of at least two different types of trapping regions that exist simultaneously and that are typically used in conjunction with a mass spectrometer for performing trapping, separation, and analysis of various particles including charged particles and charged particles derived from atoms, molecules, particles, sub-atomic particles and ions. For brevity, all of these particles are referred to throughout this document as ions.

Figure 1:
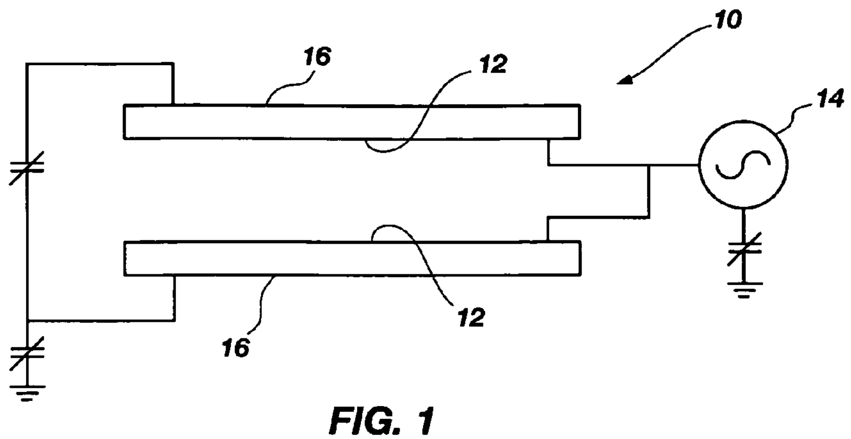
FIG. 1 (PRIOR ART)
FIG. 1 is a profile view of two opposing plates of a virtual ion trap taught in the prior art.
Figure 2:
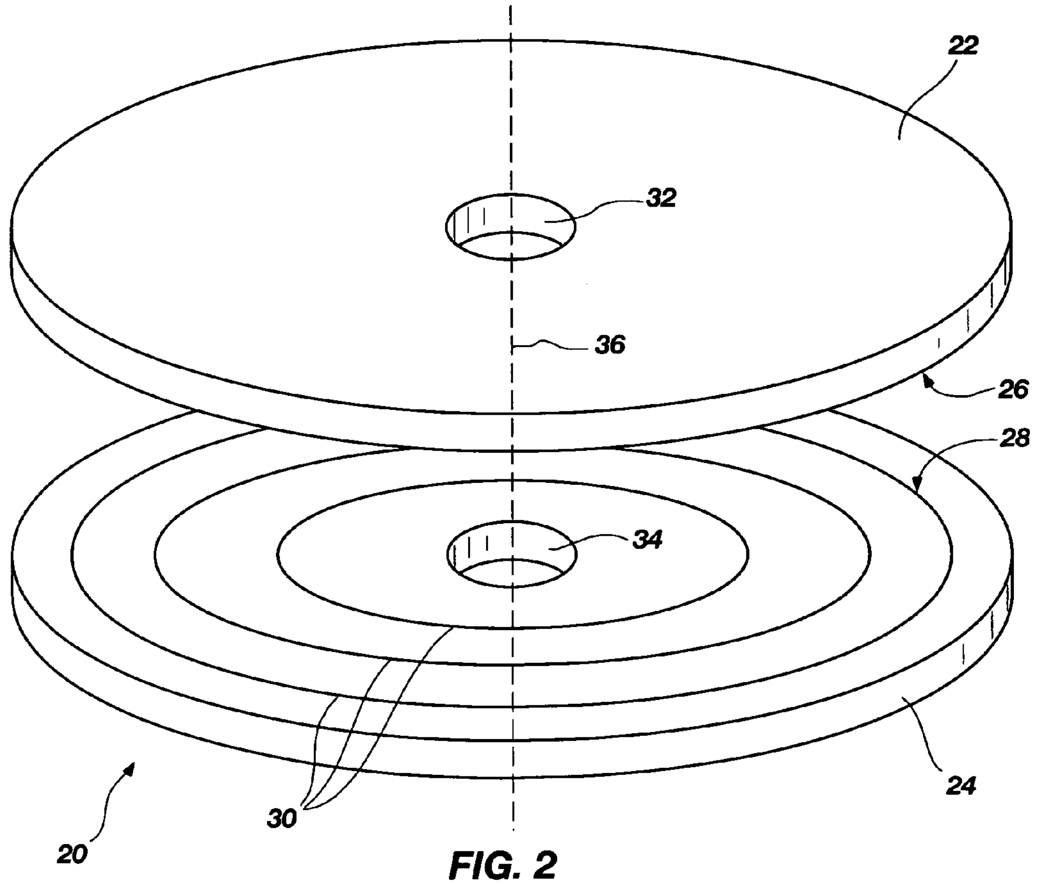
FIG. 2 is a perspective view of a coaxial hybrid ion trap made in accordance with the principles of the present invention.

The first embodiment is shown in FIG. 2. The coaxial hybrid ion trap 20 is made using two ceramic plates 22, 24, wherein both substantially planar facing surfaces 26, 28 are lithographically imprinted with a plurality of metal rings, lines, or other shapes 30, and overlaid with a thin layer of a semi-conducting material. In this first embodiment, a hole 32, 34 is disposed through each of the plates 22, 24. The hole 32, 34 in this embodiment is used for injection into or ejection of ions from the between the plates 22, 24.

It is noted that the opposing faces 26, 28 are substantially planar, but that it is possible to introduce protrusions or projections outwards from the faces without departing from the purposes and capabilities of the present invention. Accordingly, protrusions, projections and other deviations from a truly planar surface should all be considered to be within the scope of the present invention.

The number of rings 30 shown is for illustration purposes only and should not be considered a limiting factor. The shape of the rings, lines and shapes 30 are chosen in order to facilitate the desired shape of the trapping regions that are generated between the plates 22, 24. It is possible that the present invention will function without the semi-conducting material on the rings 30, although preliminary results suggest that using such a material benefits instrument performance.

Electrical potentials are imposed on the semi-conducting material by the metal rings, lines, or other shapes (hereinafter metal rings 30). The electrical potentials on the metal rings 30 are created using a voltage divider or other control electronics as is known to those skilled in the art. The electrical potentials on the rings 30 include a primary time-varying (such as, but not limited to a radiofrequency signal) component, and may include other time-varying or static components. Ion motion is then manipulated using the electrical fields generated by these electrical potentials.

The coaxial hybrid ion trap 20 consists of at least two and possibly more radiofrequency charged particle trapping regions oriented about a common axis 36. The trapping regions are of two types or shapes. The first trapping region is a quadrupole, Paul or quadrupole region 40 disposed as shown in FIG. 3 (hereinafter the term "quadrupole" will be used).

Figure 3:
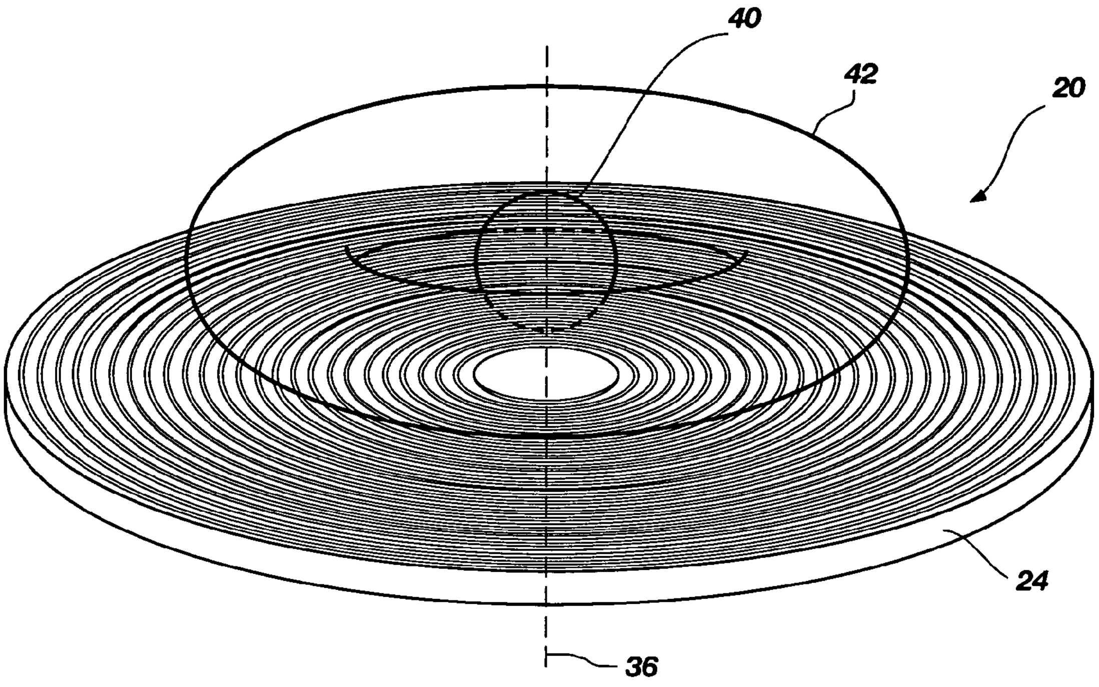
FIG. 3 is a perspective view of one plate and a three dimensional view of the two different trapping regions.

FIG. 3 is a perspective view of the coaxial hybrid ion trap 20 with one of the plates removed to expose the three dimensional shape of the two trapping regions created by this embodiment. The quadrupole trapping region 40 is shown surrounded by a toroidal trapping region 42. It is noted that there are more than one type of trap that can generate a toroidal trapping region, and all such traps should be considered to be within the scope of the present invention.

Figure 4:
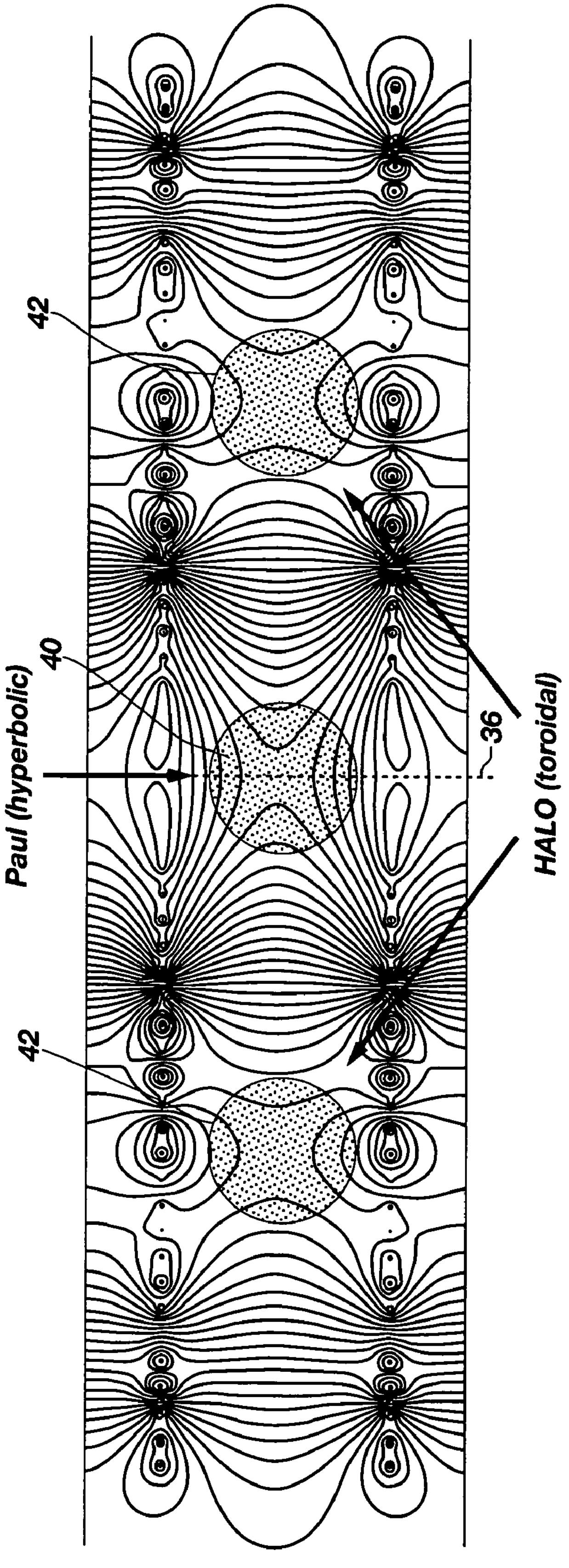
FIG. 4 is a cut-away profile view of electric field lines that create the two different trapping regions between the plates.

FIG. 4 is a cut-away profile view of the equipotential field lines in the coaxial hybrid ion trap 20. The toroidal trapping region 42 is thus shown as two circles in this cut-away view. The quadrupole trapping region 40 is also shown as a circular region. The central axis 36 is shown passing through a center of the quadrupole trapping region 36.

Figure 5:
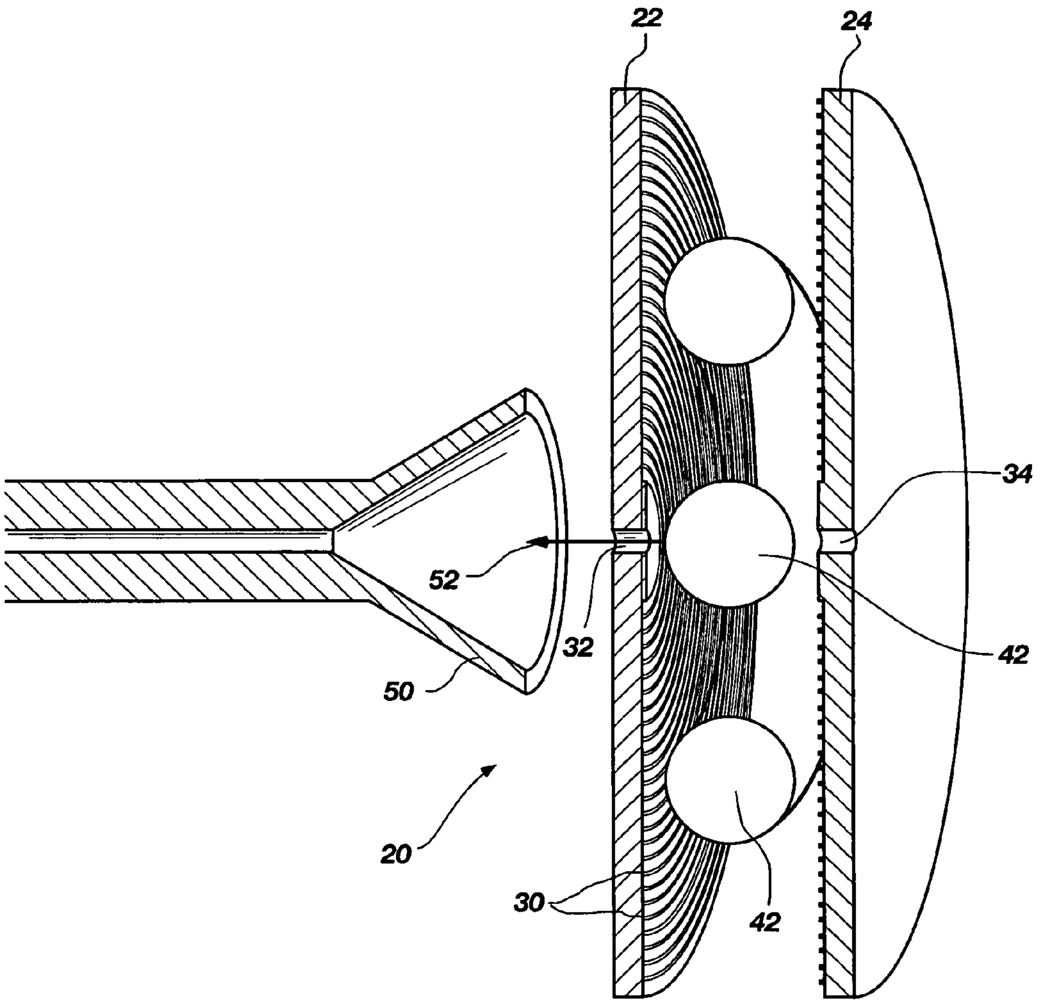
FIG. 5 is a cut-away perspective view of the coaxial hybrid ion trap and a detector.

FIG. 5 is a perspective cut-away view of the coaxial hybrid ion trap 20. In one embodiment, molecules are ionized and trapped in the primary trapping region which is the toroidal trapping region 42. A first selective ejection of ions is made from the toroidal trapping region 42 to the secondary or quadrupole trapping region 40. A second selective ejection of ions is made from the quadrupole trapping region 40 through hole 32 to a detector (not shown) through conduit 50 in the direction of the arrow 52.

Figure 6:
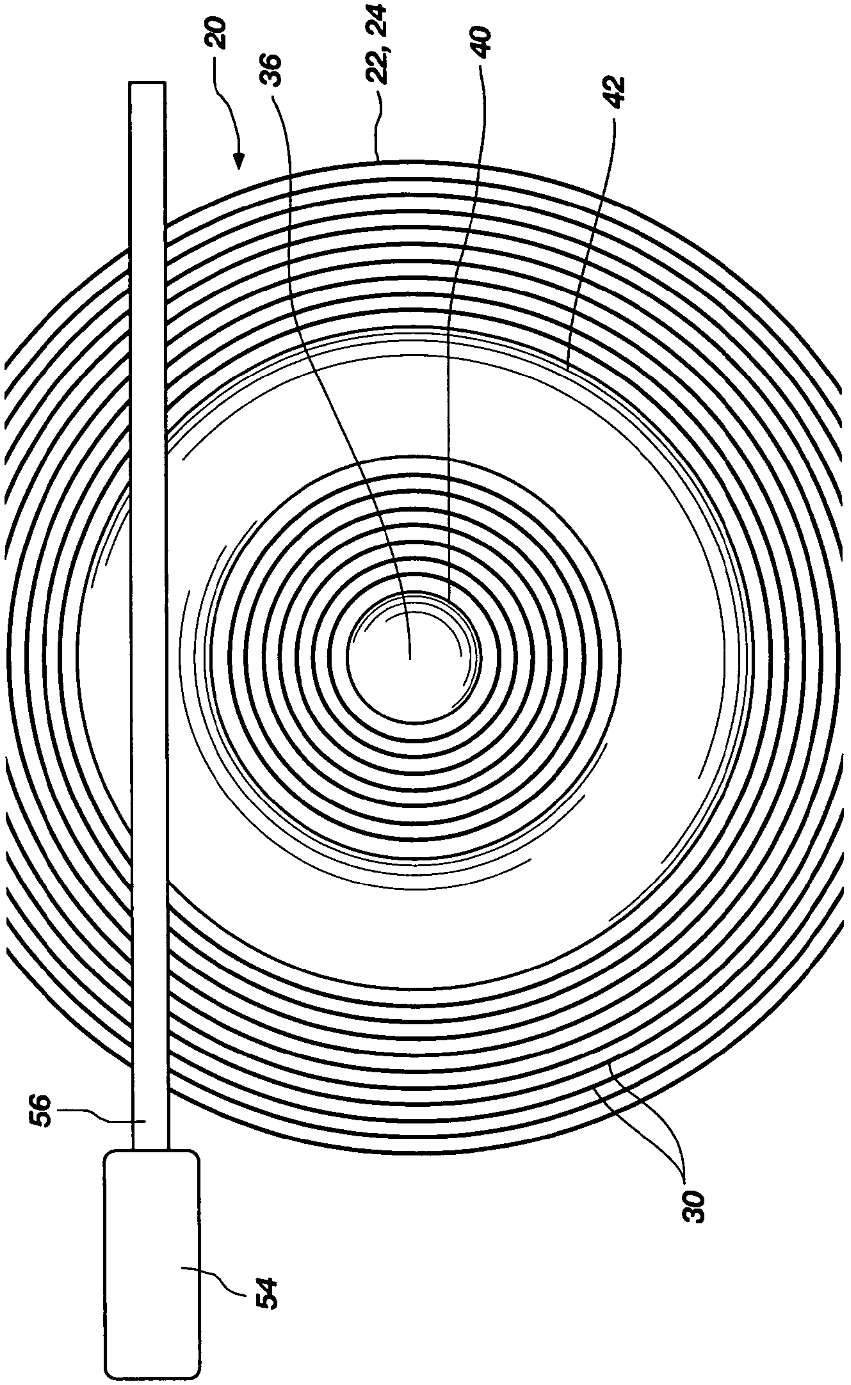
FIG. 6 is cut-away top down view of the coaxial hybrid ion trap showing the trapping regions and an electron gun.

FIG. 6 is a top view of the coaxial hybrid ion trap 20. In this figure, an electron gun 54 is shown with a beam path 56 being directed tangentially with respect to the toroidal trapping region 42. Molecules that are ionized are trapped in and only in the toroidal trapping region 42. Manipulation of the electrical field lines facilitates movement between the trapping regions 40, 42 and out to a detector.

While FIG. 6 shows an electron gun 54, this coaxial hybrid ion trap 20 can be used with many of the existing methods for ionization, including but not limited to electrospray, sonic spray, laser desorption ionization, matrix-assisted laser desorption ionization, pyrolysis, electron ionization, radiation ionization, particle beam ionization, photoionization, desorption ionization, and variations on these methods. In the current incarnation of the present invention, the coaxial hybrid ion trap 20 uses in situ electron ionization. Electrons are injected into the trap 20 and ionize gaseous molecular or atomic species that are present in one or more of the trapping regions 40, 42. It is possible, but not necessary, to control the trapping region 40, 42 in which ionization takes place. Ions can be created in situ or they can be injected from external ion sources. Injection can occur radially from a direction between the plates 22, 24, or can occur through a slit or other aperture disposed through the plates.

The opposing faces of the plates 22, 24 have a thin germanium layer disposed thereon. This germanium layer has several advantageous features. First, the germanium smoothes out the electrical potentials between rings, thereby improving the electric field between the plates. The germanium coating also ensures that the electrical potential at every point on the surface of the plates 22, 24 is known and controllable.

Second, the germanium coating reduces or prevents charge build-up which would otherwise occur on the insulating ceramic material of the plates 22, 24. This charge build-up is the result of ions and/or electrons hitting the plates 22, 24. The cumulative charge affects the electric field lines, and thus distorts the performance of the coaxial hybrid ion trap 20.

Third, the germanium layer has a small and rather unimportant contribution to the voltage dividing along the set of rings 30. Most of the electrical current does not go through the germanium, so the germanium does not heat up significantly.

It should be understood that other materials can be substituted for the germanium coating on the rings 30. The properties that are important for the coating include having an electrical resistivity in the semiconductor range, which is $10^{-5}$ to $10^{5}$ ohms. The layer has a thickness of 50 nm, but any thickness in the range of 1 nm to several tens of microns might be used. If the electrical resistivity is substantially higher than this range, the layer could not perform the function of preventing charge build-up. If the electrical resistivity is substantially lower than this range, too much current would pass through the layer, causing it to heat up, or to disrupt the voltage dividing circuit.

Accordingly, any semi-conducting material could be used for this layer, in any reasonable thickness less than or similar to the spacing between ring electrodes. Materials could include but are not limited to silicon, germanium, carbon, compound semiconductors, and doped or modified glasses.

The coaxial hybrid ion trap 20 of the present invention is capable of performing trapping and mass analysis in both the toroidal trapping region 42 and the quadrupole trapping region 40 independently, but it is also possible to move ions from one trapping region 40, 42 to the other. For example, ions can be trapped in the toroidal trapping region 42, and then ejected into the quadrupole trapping region 40. In this way, the advantages of each trapping region's geometry can be utilized. The larger storage capacity of the toroidal trapping region 42 is useful for increasing sensitivity without suffering the effects of high space-charge. In contrast, the higher resolution of the quadrupole trapping region 40 is useful for its greater analytical capability.

The presence of not only more than one trapping region but different types of trapping regions within a single device permits capabilities not possible in other ion traps, including certain types of tandem mass analysis, mass-selective preconcentration, certain types of ion-ion or ion-molecule reactions, and increased analytical performance. Ions can be moved between trapping regions 40, 42, so that more than one ion manipulation process (e.g., mass analysis, excitation) can be done simultaneously.

The coaxial hybrid ion trap 20 further improves the duty cycle and throughput over other ion traps because different trapping regions 40, 42 can be dedicated to separate tasks. For example, one trapping region is dedicated to trapping and rough analysis, while another trapping region is dedicated to careful analysis.

The design of this coaxial hybrid ion trap 20 retains all of the advantages of the virtual ion trap described previously and an ion trap having only a toroidal trapping region. Specifically, electric fields can be optimized and changed electronically, rather than by changing the physical electrode structure. The arrangement of the two plates 22, 24 provides an open structure, facilitating ion injection, gas flow, and optical experiments within the trap 20. In addition, the plates 22, 24 can be made and aligned with high precision, eliminating the problems of alignment and machining tolerances that affect other types of traps.

The coaxial hybrid ion trap 20 is also ideal for miniaturization. Not only can the fields and geometry be easily controlled, but issues such as surface roughness and capacitance, which affect other miniaturized traps, do not affect the coaxial trap 20. Finally, the combination of a larger toroidal trapping region 42 and a smaller quadrupole trapping region 40 eliminates many of the issues associated with sensitivity and ion capacity in miniaturized traps.

While ions can be injected, moved from one trapping region to another and then ejected, the trapping regions are not restricted to these activities. Ions do not have to be moved from one trapping region to the other. Thus, the trapping regions can operate independently or they can interact with each other as desired. Furthermore, a trapping region does not have to be used for trapping or for mass analysis. In addition, the trapping regions 40, 42 are not intended to be used only in a parallel manner.

Ions can be mass analyzed in any or both of the ion trapping regions 40, 42 using any of the established methods for ion trap mass analysis. This includes but is not limited to scanning voltage or frequency, scanning plate spacing (which has never been done before in the prior art, but should work using the present invention), resonant ejection, axial modulation, apex isolation, or any other operation in which ions are moved to a part of the Mathieu stability space for the purpose of mass analysis.

In the current coaxial hybrid ion trap 20, ions are resonantly ejected out of the toroidal trapping region 42 into the quadrupole trapping region 40, and from the quadrupole trapping region to a detector. However, ions can also be radially ejected from the quadrupole trapping region 40 to the toroidal trapping region 42. Ions analyzed in this coaxial hybrid ion trap 20 will be detected using any of the established methods for ion detection, including but not limited to electron multipliers, optical detection methods, image charge and image current detection, solid state ion detectors, conversion dynodes, or cryogenic detectors.

Having described typical function of the coaxial hybrid ion trap 20, the present invention is capable of some unique functions. For example, it is possible to move the trapping regions in the space between the plates 22, 24. Consider the possibility of shuttling ions from one trapping region to another trapping region by use of a "moving" trapping region that travels between two trapping regions.

The practical applications of this moving ion trap include the possibility of collision induced dissociation experiments (in which ions are moved from one trapping region, then excited by a dipolar field and fragmented, then moved into the other trapping region), or other dissociation experiments. It is also possible that trapping regions can move during or between mass analyses. The present invention can therefore focus ions from a larger toroidal trapping region 42 into a smaller trapping region by shrinking the trapping region while ions are in it. This would result in a mass-selective pre-concentration.

Trapping regions can be moved by changing the potential function imposed on the germanium layer disposed on the plates 22, 24. In other words, actively changing the voltage that each metal ring 30 receives will change the location of the trapping regions.

Another possible application of this device is in controlled reactions of oppositely-charged species. For instance, positive ions can be contained in one trapping region, while negatively charged species can be contained in another trapping region. Then the ions are caused to come together in a controlled fashion in order for them to react, and the charge reaction by-products are still trapped.

Tandem mass analysis refers to analysis in which mass-analyzed ions are fragmented, and some or all of the fragments are also mass-analyzed. Tandem analysis is particularly useful for positive identification of molecules, for protein sequencing, etc.

It is believed that the coaxial hybrid ion trap 20 can be used for tandem mass analysis in several ways. First, the device can perform all the types of tandem mass analysis that can be done in other ion traps. These are collectively called tandem-in-time experiments, in which analysis, fragmentation, and fragment analysis are done in the same trapping region. This includes multiple generation fragment analysis ($MS^n$).

Second, tandem-in-space experiments include, but are not limited to, constant neutral loss scans and precursor ion scans. Such tandem-in-space experiments can be done using a triple quadrupole mass spectrometer, which is significantly larger than the coaxial hybrid ion trap 20 of the present invention. The coaxial hybrid ion trap 20 can replace the larger triple quadrupole mass spectrometer and perform these same tandem-in-space measurements.

Ions can be ejected from the coaxial hybrid ion trap 20 to a detector. Ions are ejected after being analyzed or otherwise manipulated in one or more of the ion trapping regions. Ions can be ejected through a hole or slit in the ceramic plates 22, 24. They could also possibly be ejected radially outward. In the current configuration, ions are ejected through holes 32, 34 at the center of the plates 22, 24. However, alternative embodiments will discuss other configurations for ejecting ions.

Figure 7:
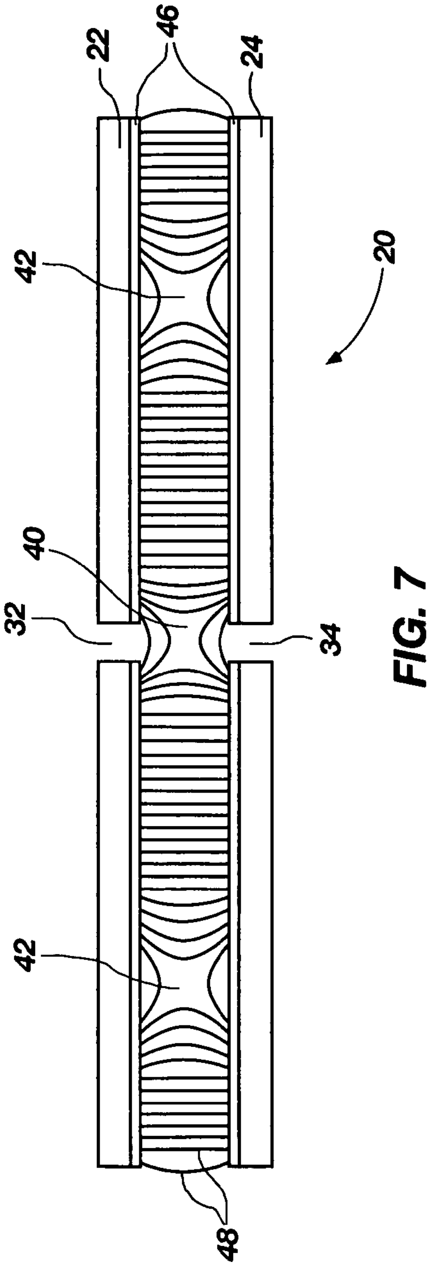
FIG. 7 is a cut-away profile view of the coaxial hybrid ion trap showing electric field lines and the trapping regions.

FIG. 7 is provided as a profile view of the first embodiment of the present invention showing the plates 22, 24, the germanium layer 46, the quadrupole trapping region 40, the toroidal trapping region 42, the field lines 48 between the plates, and two holes 32, 34 for injecting and ejecting ions from the coaxial hybrid ion trap 20.

Figure 8:
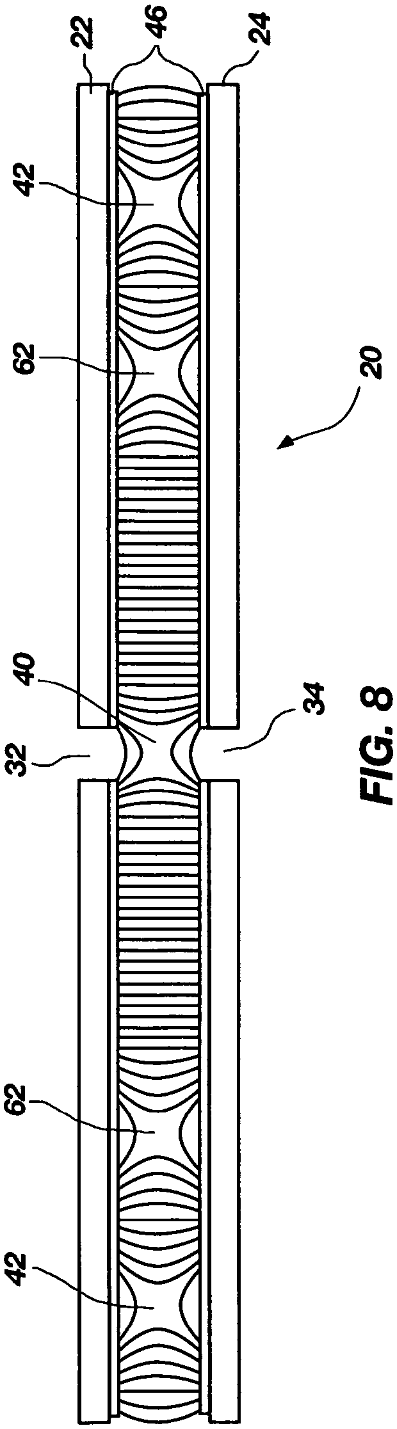
FIG. 8 is a cut-away profile view of the coaxial hybrid ion trap showing an additional toroidal trapping region.

FIG. 8 is a profile view of an alternative embodiment that includes two toroidal trapping regions, 42 and 62. This embodiment includes the plates 22, 24, the germanium layer 46, and the two holes 32, 34. The new toroidal trapping region 62 is shown disposed between the original toroidal trapping region 42 and the quadrupole trapping region 40. However, this placement is arbitrary. What is important to understand is that any desired number of toroidal trapping regions can be disposed around the quadrupole trapping region 40. An important limiting factor is the geometry of the rings 30 that are used to create the different trapping regions.

Figure 9:
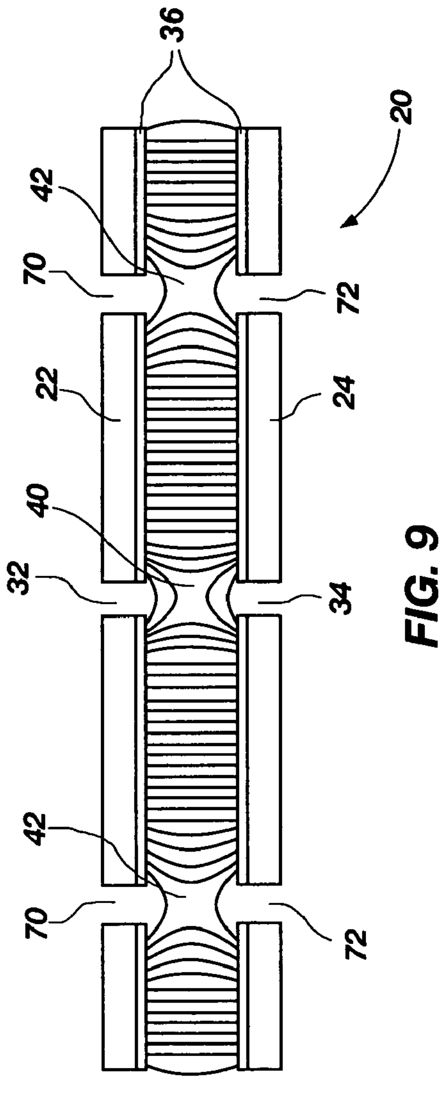
FIG. 9 is a cut-away profile view of the coaxial hybrid ion trap showing an additional aperture in the plates for injecting or ejecting ions.

FIG. 9 is a profile view of another alternative embodiment, wherein the embodiment includes the plates 22, 24, the germanium layer 46, the two holes 32, 34, the quadrupole trapping region 40 and the toroidal trapping region 42. However, in addition to the design are additional slits 70, 72 in the plates 22, 24. These slits 70, 72 enable the injection and ejection of ions directly into and out of the toroidal trapping region 42 from a non-radial direction. It should be understood that additional toroidal trapping regions can also be included, with or without their own slits for injecting or ejection ions.

Figure 10:
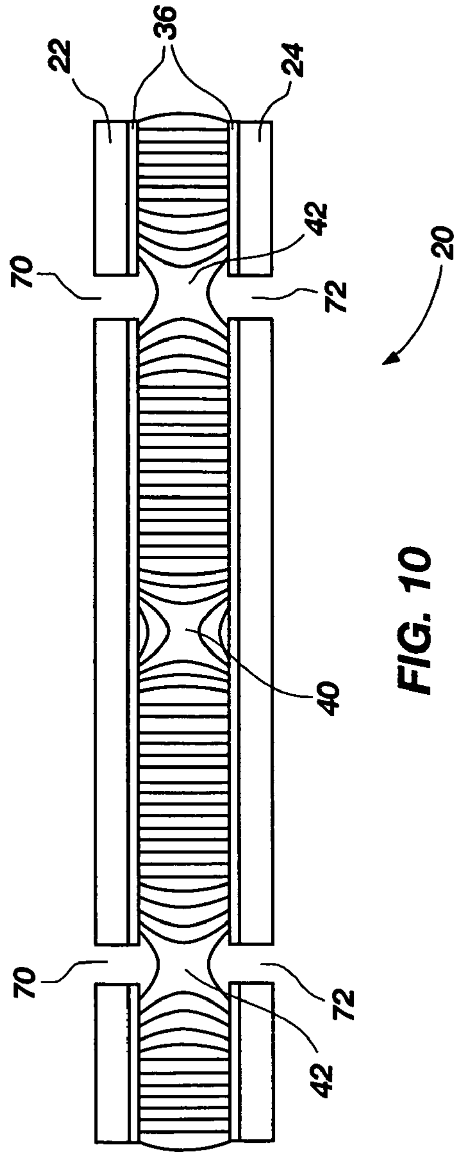
FIG. 10 is a cut-away profile view of the coaxial hybrid ion trap showing the central aperture closed and another aperture opened into the toroidal trapping region.

FIG. 10 is a profile view of another alternative embodiment of the present invention. Specifically, the central holes 32, 34 are now removed from the configuration. The only non-radial injection and ejection ports are the slits 70, 72 into the toroidal trapping region 42.

Figure 11:
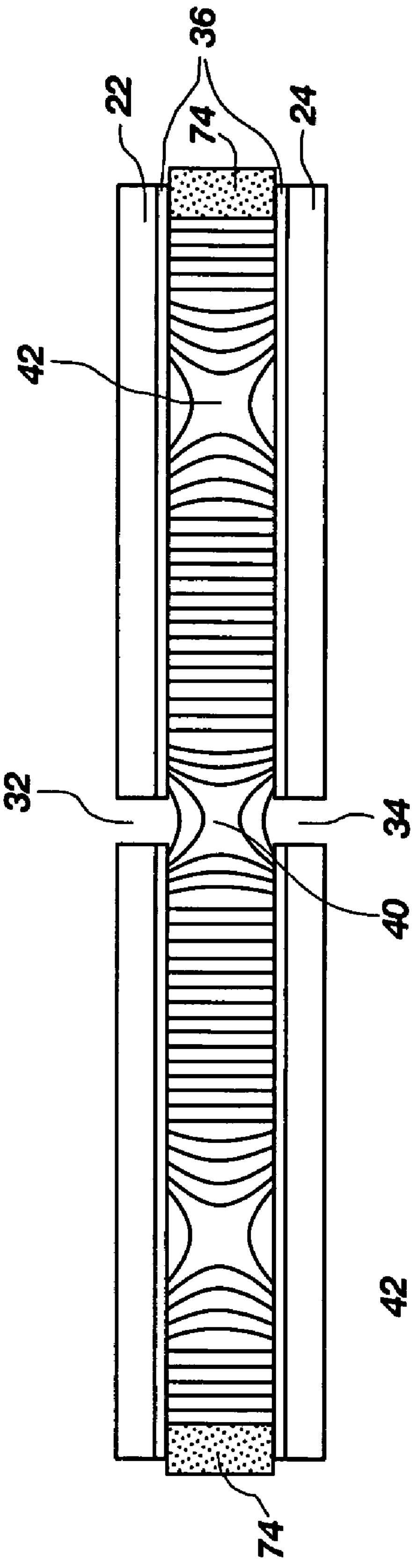
FIG. 11 is a cut-away profile view of the coaxial hybrid ion trap showing a metal spacer inserted between the plates to strengthen electric field lines.

FIG. 11 is a profile view of another alternative embodiment of the present invention. Any of the embodiments shown in FIGS. 7-10 can include a metal spacer 74 disposed between the plates 22, 24 around an outer edge thereof. The metal spacer 74 has the advantage of improving the electrical field between the plates 22, 24, and can also serves as a means of ensuring plate alignment. The metal spacer 74 will circumscribe the entire outer edge of the plates 22, 24. Apertures may be disposed therethrough for the injection or ejection of ions.

In some trapping scenarios the outsides of the plates 22, 24 (outside diameter or outside rings) need to be grounded. In others, the outsides need to have an RF potential put on it. A spacer, ring, or other conducting or semi-conducting material can be put near the outside to help establish the potential in this region. For instance, a metal spacer 74 acts to establish the potential near the outside of the trap 20. In all cases the trap 20 can operate without this metal spacer 74, but in many cases it could improve performance. The metal spacer 74 can also be designed in such a way as to control or limit gas flow into or out of the trap 20.

Figure 12:
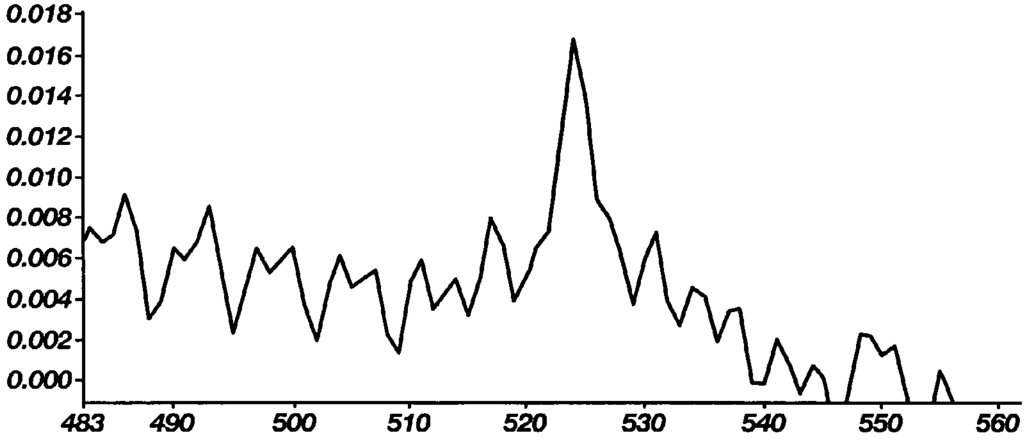
FIG. 12 is a graph showing results from the coaxial hybrid ion trap.

FIG. 12 is a first graph showing quadrupole resonance ejection of naphthalene. Ejection from the toroidal trapping region 42 was a broad band ejection to the quadrupole trapping region 40 before resonance scan. Peak shown is m/z 128 at index 525.

Figure 13:
FIG. 13 is a graph showing results from the coaxial hybrid ion trap.

FIG. 13 is a graph showing quadrupole resonance ejection of toluene. Ejection from the toroidal trapping region 42 was a broad band ejection to the quadrupole trapping region 40 before resonance scan. Peak shown is m/z 91 and 92 at index 173 and 178 respectively.

Figure 14:
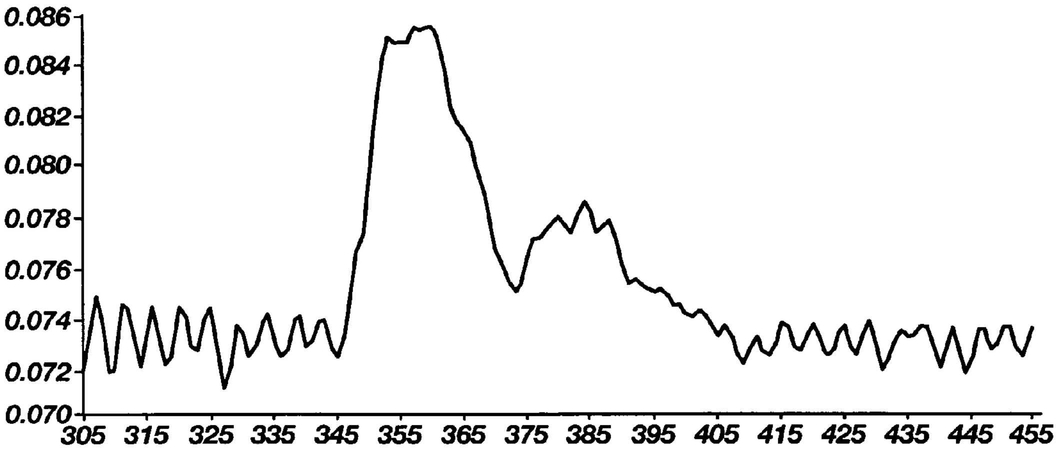
FIG. 14 is a graph showing results from the coaxial hybrid ion trap.

FIG. 14 is a graph showing quadrupole scan ejection of dichloromethane. Ejection from the toroidal trapping region 42 was a broad band ejection to the quadrupole trapping region 40 before resonance scan. View was expanded to show supposed chlorine isotopes.

Figure 15:
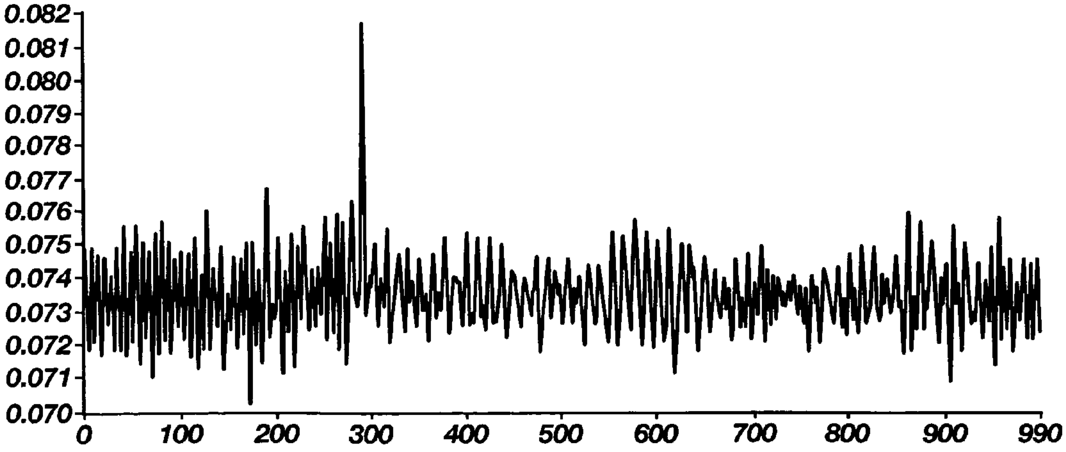
FIG. 15 is a graph showing results from the coaxial hybrid ion trap.

FIG. 15 is a graph showing quadrupole resonance ejection of toluene. Ejection from the toroidal trapping region 42 was a broad band ejection to the quadrupole trapping region 40 before resonance scan. Quadrupole trapping region 42 was continuously exposed to a 1 kHz ejection pulse so as to non-selectively eject all contents of the quadrupole trapping region, while modulating the signal. Peak shown is m/z 92 at index 290.

Figure 16:
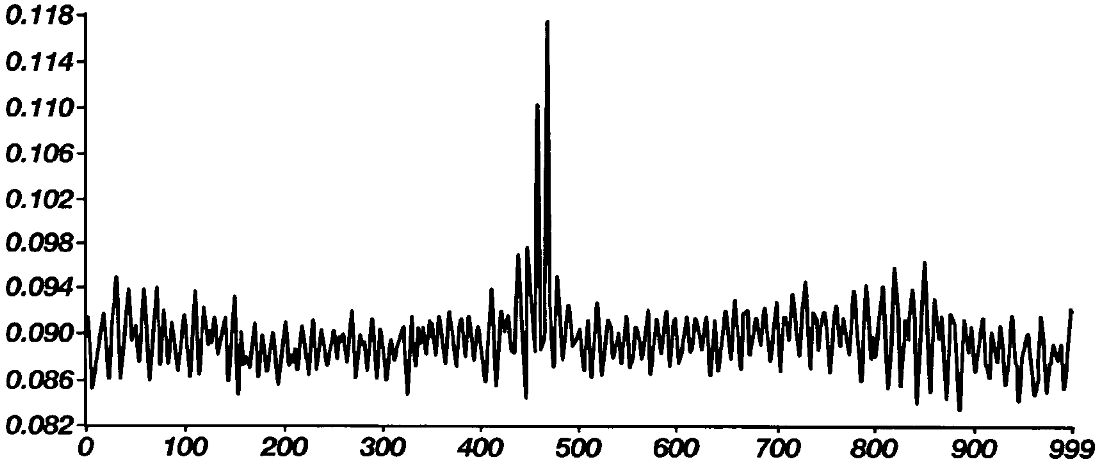
FIG. 16 is a graph showing results from the coaxial hybrid ion trap.

FIG. 16 is a graph showing quadrupole resonance ejection of naphthalene. Ejection from the toroidal trapping region 42 was a broad band ejection to the quadrupole trapping region 40 before resonance scan. Toroidal trapping region 42 was continuously exposed to a 1 kHz ejection pulse so as to non-selectively eject all contents of the quadrupole trapping region, while modulating the signal. Peak shown is m/z 128 at index 470.

As stated previously, the combination of a toroidal ion trap and a quadrupole ion trap in the present invention results in significant advantages over other ion traps. It should be mentioned that one of these advantages is that the coaxial hybrid ion trap 20 can be run as a simple MS, IMS/MS, MS/IMS and/or MS/MS system.

In the modes of IMS/MS, MS/IMS and MS/MS there is no loss of ions as in traditional ion trap systems. This is because the selection of one ion in mass or mobility selection is done by ejecting from one ion trap to another while the unselected ions remain trapped. Traditional systems select an ion by destabilization of all other ions, resulting in the loss of those ions. Broadband destabilization can still be done resulting in emptying either or both ion traps.

In the present invention, because the trapping region and the final MS ejection region are not the same, ionization can be done 100% of the time. This is because pseudo trapped ions (ions not trapped in the center of the trapping fields, and thus quickly loose stability) will be destabilized without a direct line to the detector. The current from such ions is traditionally dealt with by gating off the detector during ionization and only scanning when ionization is off.

Mass scan out can also be done with 100% duty cycle. In order to allow cooling of the ions, ejection from the toroidal trapping region 42 to the quadrupole trapping region 40 can be set up such that a given m/z is ejected from the toroidal trapping region 42 and into the quadrupole trapping region 40 and is given some time to cool before it is ejected from the quadrupole trapping region 40 to a detector. For example, both trapping regions 40, 42 continually scan out masses, the toroidal trapping region 42 to the quadrupole trapping region 40, and the quadrupole trapping region 40 to the detector, but the toroidal trapping region 42 ejects a given mass 10 ms earlier than the quadrupole trapping region would for the same mass. This gives the ion 10 ms of cooling time before being ejected into the detector, and also lessens ion-ion repulsion as only a small subset of ions are in the center trap resulting in an improvement to mass resolution.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

The invention claimed is:

1. A method for providing a coaxial hybrid ion trap by providing at least two types of ion trapping regions, said method comprising the steps of:

(1) providing at least two substantially planar parallel surfaces that are oriented so as to have opposing faces having a central axis therethrough, and disposing a plurality of electrodes on the opposing faces for generating electric fields that create trapping regions;

(2) creating a quadrupole trapping region disposed coaxially and between the two substantially planar parallel surfaces; and (3) creating at least one toroidal trapping region disposed coaxially around the quadrupole trapping region.

2. The method as defined in claim 1 wherein the method further comprises the step of using the at least one toroidal trapping region to provide increased storage of ions and thereby obtain high sensitivity from the coaxial hybrid ion trap.

3. The method as defined in claim 1 wherein the method further comprises the step of using the quadrupole trapping region to obtain high resolution and an improved analytical capability from the coaxial hybrid ion trap.

4. The method as defined in claim 1 wherein the method further comprises the step of creating at least another toroidal trapping region disposed coaxially with respect to the quadrupole trapping region.

5. The method as defined in claim 1 wherein the method further comprises the step of dynamically changing a position of the at least one toroidal trapping region with respect to the central axis.

6. The method as defined in claim 1 wherein the method further comprises the step of changing a total volume of the quadrupole trapping region or the at least one toroidal trapping region.

7. The method as defined in claim 1 wherein the method further comprises the step of moving ions between the quadrupole trapping region and the at least one toroidal trapping region.

8. The method as defined in claim 1 wherein the method further comprises the steps of:

(1) enclosing ions in one trapping region inside a mobile trapping region;

(2) moving the mobile trapping region from a source trapping region to a destination trapping region; and (3) releasing the ions into the destination trapping region.

9. The method as defined in claim 1 wherein the method further comprises the step of lithographically imprinting the at least two substantially planar parallel surfaces with a plurality of rings or lines to create electrodes for the electric fields.

10. The method as defined in claim 9 wherein the method further comprises the step of coating the at least two opposing faces with a semi-conducting material to thereby facilitate creating the electric fields.

11. The method as defined in claim 10 wherein the method further comprises the step of using germanium to coat the at least two opposing faces.

12. The method as defined in claim 1 wherein the method further comprises the step of providing means for injecting ions into and ejecting ions from the coaxial hybrid ion trap through the at least two substantially planar parallel surfaces.

13. The method as defined in claim 12 wherein the method further comprises the step of providing at least one aperture through the opposing faces to enable injecting ions into and ejecting ions from the coaxial hybrid ion trap.

14. The method as defined in claim 1 wherein the method further comprises the steps of:

(1) assigning a first task to be performed by the quadrupole trapping region;

(2) assigning a different task to be performed by the at least one toroidal trapping region; and (3) wherein the first task and the different task are performed simultaneously.

15. The method as defined in claim 14 wherein the method further comprises the step of enabling the first task and the different task to cause the quadrupole trapping region and the at least one toroidal trapping region to interact.

16. The method as defined in claim 1 wherein the method further comprises the step of performing controlled reactions of oppositely-charged species using the at least two trapping regions.

17. The method as defined in claim 1 wherein the method further comprises the step of performing tandem-in-space experiments.

18. The method as defined in claim 1 wherein the method further comprises the step of improving the electric field between the opposing faces by inserting a metal spacer between the opposing faces around an outer edge thereof.

19. A coaxial hybrid ion trap that provides at least two types of ion trapping regions, said ion trap comprised of:

at least two substantially planar and parallel surfaces oriented so as to have opposing faces that are oriented with respect to a common central axis passing through the opposing faces;

a plurality of electrodes disposed on the opposing faces for generating electric fields that create trapping regions;

a quadrupole trapping region disposed coaxially with and between the two substantially planar parallel surfaces; and at least one toroidal trapping region disposed coaxially around the quadrupole trapping region.

20. The coaxial hybrid ion trap as defined in claim 19 wherein the coaxial hybrid ion trap is further comprised of at least another toroidal trapping region disposed coaxially with respect to the quadrupole trapping region.

21. The coaxial hybrid ion trap as defined in claim 19 wherein the coaxial hybrid ion trap is further comprised of electrical potential means for dynamically changing a position of the at least one toroidal trapping region relative to the central axis.

22. The coaxial hybrid ion trap as defined in claim 19 wherein the coaxial hybrid ion trap is further comprised of electrical potential means for changing a total volume of the quadrupole trapping region or the at least one toroidal trapping region.

23. The coaxial hybrid ion trap as defined in claim 19 wherein the coaxial hybrid ion trap is further comprised of electrical potential means capable of moving ions between the quadrupole trapping region and the toroidal trapping region.

24. The coaxial hybrid ion trap as defined in claim 19 wherein the coaxial hybrid ion trap is further comprised of electrical potential means that enable:

(1) enclosing ions in one trapping region inside a mobile trapping region;

(2) moving the mobile trapping region from a source trapping region to a destination trapping region; and (3) releasing the ions into the destination trapping region.

25. The coaxial hybrid ion trap as defined in claim 19 wherein the coaxial hybrid ion trap is further comprised of a plurality of rings or lines disposed on the opposing faces that are lithographically imprinted with a semi-conducting material to thereby facilitate creating the electric fields.

26. The coaxial hybrid ion trap as defined in claim 25 wherein the semi-conducting material is selected from the group of semi-conducting materials comprising silicon, germanium, carbon, compound semiconductors, and doped or modified glasses.

27. The coaxial hybrid ion trap as defined in claim 19 wherein the coaxial hybrid ion trap is further comprised of means for injecting ions into and ejecting ions from the coaxial hybrid ion trap through the at least two substantially planar parallel surfaces.

28. The coaxial hybrid ion trap as defined in claim 27 wherein the coaxial hybrid ion trap is further comprised of at least one aperture through the opposing faces to enable injecting ions into and ejecting ions from the coaxial hybrid ion trap.

29. The coaxial hybrid ion trap as defined in claim 19 wherein the coaxial hybrid ion trap is further comprised of a metal spacer disposed between the opposing faces around an outer edge thereof.

* * * * *